(12) United States Patent
Yeluripati et al.

(10) Patent No.: US 7,086,065 B1
(45) Date of Patent: Aug. 1, 2006

(54) FUNCTIONAL ENTERPRISE BEAN

(75) Inventors: Purushottam Yeluripati, White Plains, NY (US); Jonathan Mark Nicholas Leigh, Stormville, NY (US); Joaquin Manuel Marques, Greenwich, CT (US)

(73) Assignee: Telesector Resources Group, Inc., New York, NY (US)

( * ) Notice: Subject to any disclaimer, the term of this patent is extended or adjusted under 35 U.S.C. 154(b) by 472 days.

(21) Appl. No.: 09/620,102

(22) Filed: Jul. 20, 2000

(51) Int. Cl.
*G06F 15/163* (2006.01)

(52) U.S. Cl. ........................... 719/311; 705/42
(58) Field of Classification Search ........ 709/311–313, 709/201–250; 717/101–119; 707/100–104.1, 707/1–10; 719/311–320, 328; 705/1–10, 705/35, 42
See application file for complete search history.

(56) References Cited

U.S. PATENT DOCUMENTS

| | | | |
|---|---|---|---|
| 5,874,958 A | 2/1999 | Ludolph | 345/339 |
| 5,937,411 A | 8/1999 | Becker | 707/103 |
| 6,016,498 A | 1/2000 | Bakke et al. | 707/103 |
| 6,018,627 A | 1/2000 | Iyengar et al. | 395/701 |
| 6,023,684 A | 2/2000 | Pearson | 705/35 |
| 6,026,401 A | 2/2000 | Brealey et al. | 707/8 |
| 6,298,478 B1* | 10/2001 | Nally et al. | 717/6 |
| 6,629,128 B1* | 9/2003 | Glass | 709/203 |
| 2002/0004856 A1* | 1/2002 | Sudarshan et al. | 709/330 |
| 2002/0104071 A1* | 8/2002 | Charisius et al. | 717/109 |

OTHER PUBLICATIONS

Pospisil R et al. "On Performance of Enterprise JavaBeans" Oct. 1999 pp. 1-11.*
Matena V et al "Sun Microsystems Enteripse JavaBeans" Mar. 1998 pp. 1-181.*

* cited by examiner

*Primary Examiner*—William Thomson
*Assistant Examiner*—Charles Anya
(74) *Attorney, Agent, or Firm*—Leonard C. Suchtya, Esq.; Joel Wall, Esq.; Rader Fishman & Grauer PLLC

(57) ABSTRACT

The disclosure is directed to a new software component, an enterprise application server component such as an enterprise bean, called a "functional bean," which models a business method, and accords transactional persistence. The functional bean can be developed as a derived object from an enterprise bean class, and can call other beans to execute a transaction.

A client initiates a transaction by requesting a container using an EJBObject of an appropriate functional bean type. A Service Manager bean handles an appropriate instance of a functional bean. After the Service Manager creates and returns the requested handle to the client, the client thereafter can access the functional bean directly. In this way, transactional awareness to the client is achieved.

In a second embodiment, the Service Manager is implemented as a stateless session bean, and other functional beans are implemented as entity beans.

19 Claims, 14 Drawing Sheets

FUNCTIONAL ENTERPRISE BEAN

TECHNICAL FIELD

The present invention is related in general to component-based multi-tier computing methods, and in particular, to a functional enterprise bean component, and a system for efficient management of components.

BACKGROUND

With the rise of interconnected computer networks such as intranets and the Internet, complex transaction-based applications that are distributed over several networked computers became a possibility. In general, these transaction-based applications function in the following way. A software application program, which executes on a computer called a client, initiates a transaction that requires access to services provided by a distant computer, called a server. Examples of these services could be an update to a database such as a bank's database, execution of a purchase order such as in the case of purchase of a security, and the like. Typically, the client sends a "request" message to the server, which then sends a "response" message containing a response to the request.

Assume that the server is not a single computer, and instead, a collection of interconnected heterogeneous computers. The request message must then be formatted in such a way that all the interconnected computers can understand and respond to the request message. This is generally the case where a client coordinates a distributed transaction, as is the case in a typical client-server model. If the collection of interconnected computers is configured in an object-oriented programming model, then software objects (or objects) that are capable of working together to provide a response to the request message can be distributed among the several computers. But in order to access the objects from a remote computer such as a client, the objects must somehow publish their existence, their addresses, their properties, the services they provide, and other details to the "outside" world. Then, a client may be able to use the services provided by sending a request message in a manner similar to making a remote procedure call ("rpc") and obtaining a response to that message.

Three paradigms arose as a result of the need to standardize the methods by which objects could be distributed and accessed over a network. These are Microsoft Corporation's Distributed Component Object Model (DCOM), JavaSoft's Java/Remote Method Invocation (Java/RMI), and Object Management Group's Common Object Request Broker Architecture (CORBA).

Though differences exist among these models, they principally work in the following way. Objects that provide services are typically located on servers. These objects are queried by applications running on clients using a specified data communication transport layer protocol-the Object Remote Procedure Call (ORPC) for DCOM; the Java Remote Method Protocol (JRMP) for Java/RMI; and the Internet Inter-ORB Protocol (IIOP) for CORBA. A client suitably formats a query message in the appropriate protocol language and transmits the query message, which is routed to the appropriate server, whereupon it is examined, and a response message is formatted and routed back to the client.

As used in the present application, the term "object" may mean the object definition, associated operations, attributes, as well as the implementation for that object. Persons of ordinary skill in the art understand that the term "object type" is used to refer to the definition of the operations and attributes that software external to the object may use to examine and operate upon the object. An object of a given type can support multiple interfaces. Additionally, the term "object" may sometimes be used to refer to an actual run-time instance of an object and will be made clear by the context.

As stated above, clients should be configured to understand the services offered by the various objects located at the servers. In DCOM, this is achieved by exposing certain methods of a DCOM server. In this paradigm, a client acquires an interface pointer to one of the server's exposed methods. This interface pointer presents itself to be locally addressable to the client. An object at the client—for example, a proxy object—uses the interface pointer and calls the server's methods in order to determine their structure and properties.

In Java/RMI, objects are encoded and transmitted ("marshaled") in streams of bytes by a process called "serialization." A server configured to be a Java/RMI server comprises objects that have predefined interfaces, which can be used to access the server objects remotely from another machine's Java Virtual Machine (JVM). A Java/RMI server object interfaces declare a set of methods that indicate the services offered by that server object. A program resident on the server called an RMI Registry stores and makes available to clients information about available server objects. Typically, a client object obtains information regarding the methods and other properties of a server object by performing an operation such as "lookup" for a server object reference. This lookup typically works by the client object specifying an address in the form of a Universal Resource Locator (URL) and transmitting the address to the server's RMI Registry.

During the early 1990s, there had been a shift from a two-tier, client-server application model to a more flexible architecture that incorporated modular separation of concerns. This resulted in breaking the application model to include a three or more-tier models, which separated business logic from system services and user interfaces. The business logic is placed in a different layer-frequently called the middle-tier or middleware- and included transaction monitoring, messaging, object request brokering, and other services. This also allowed the deployment of lightweight clients that are easy to deploy.

In general, these architectures are thought to simplify developing, deploying, and maintaining enterprise applications. The cited advantages for this architecture included a focus on the specifics of business logic programming without the need for transaction management and user-interface considerations. Thus, the multi-tier architecture enabled developers to focus on the specifics of programming their business logic, relying on various back-end services to provide the infrastructure, and client-side applications (both standalone and within web browsers) to provide the user interaction. Because of the logical separation achieved by the multi-tier model, business logic can be developed once and deployed on servers appropriate to the needs of an organization in such a way that the servers can be readily scaled to meet changing business conditions.

While the above methods are directed toward distributing the objects over a collection of networked computers, there still was a need to develop a standardized way to develop transaction-oriented systems that are vendor-independent. Traditionally, products such as TUXEDO™, CICS™, have been used to provide transaction management, security, concurrence, persistence and other services in transaction-oriented applications such as travel planning, banking and stock market transactions. But there was a problem of integrating these products with the newly emerging distributed object computing models discussed above. Additionally, it was determined that transaction-related programming logic should advantageously be separated from business logic. The middle tier, i.e., the layer between the client and the "back-end," is therefore modeled so that transaction monitors are separated from programming entities that perform only the business logic. It should be noted that the transaction monitors are infrastructure components insofar as they are a part of application server architecture. Transaction monitors need not be implemented as objects.

This need for a standardization resulted in the Enterprise JavaBean™ (EJB) computing model, which took advantage of the technological advances such as the JDBC technology. The servlet technology enabled developers to create CGI-like behaviors that could run on any web server that supported the Java platform. The JDBC™ technology provided a model for integrating the "Write Once, Run Anywhere™" features of the Java programming language to existing database management systems. And the JavaBeans component architecture enabled encapsulation of complete sets of behavior into easily configurable, readily reusable components on the client side. The convergence of these three concepts-server-side behaviors written in the Java programming language, connectors to enable access to existing enterprise systems, and modular, easy to deploy components-led to the development of the EJB standard. It should be noted that the Enterprise JavaBeans might be used in conjunction with any of the technologies described herein.

In the discussion that follows, a reference to a "bean" indicates it is an Enterprise JavaBean or a similar component. Additionally, an "application server," a "middleware server," an "enterprise application server," or a "server" are terms used interchangeably unless otherwise qualified, each of which terms indicates a computer connected to a communication network and at least one of a plurality of back-end computers or data repositories, for example, a legacy database server.

The EJB is a server-side component model that incorporates the business logic in software components called beans. An enterprise application server or simply, a "server" that is configured as an EJB server is responsible for managing services such as transactions, persistence, concurrence and security.

The EJB architecture, which is a distributed object architecture, comprises one or more computers configured as EJB server(s), EJB container(s) that run within the EJB server(s), beans that execute within these containers, and EJB clients. EJB clients locate beans using an interface called the Java Naming and Directory Interface (JNDI); and utilize transaction support services such as Java Transaction Service (JTS). Typically, the beans are similar to the server objects described above, except that they contain only business and no transaction-monitoring logic. EJB servers provide certain predefined system services such as raw execution environment, multiprocessing, load balancing, access to devices, naming and translation service provisioning, and making EJB containers visible. EJB containers provide the interface between the EJBs and EJB clients. In general, an EJB client can access a bean only via EJB container-provided methods, which in turn invoke the bean's methods.

An EJB object is a "remote" interface object that implements the remote interface of a bean. It wraps a bean instance on the server and expands its functionality to include transactions, security and other system-level operations to the bean at runtime. Typically, an EJB container vendor provides the utilities to create the EJB object.

Similar to the EJB object class, the EJB home class is also automatically created when an Enterprise JavaBean is installed in a container. The EJB home class implements all the methods defined by the bean's home interface and is responsible for helping the container manage the bean's life cycle. The EJB home is responsible for locating, creating and removing enterprise beans, by working with the EJB Server's resource managers, instance pooling, and persistence mechanisms as needed transparently to the developer.

In the EJB model, there are two types of beans-session beans and entity beans. Session beans, as their name indicates, are used to keep track of and manage a client's session with the server. A session bean is usually associated with a single EJB client. In general, session beans do not survive a server shutdown or crash. Session beans can preserve their states through a user's session lifetime.

A stateful session bean contains state information. Typically, when a client initiates a connection with the server, the client specifies the type of EJB to which it connects on the server. When the client is finished with the session, the stateful session bean is typically removed. Thus, in a typical scenario, only one client can use an instance of a particular stateful session bean at a given time.

A stateless session bean instance is an object that can be reused by different clients, one at a time. Since it can be reused, a stateless session bean instance need not be destroyed until all clients are finished with them. Additionally, it contains no state information, and therefore, it is impossible for the client to tell one stateless session bean from another of the same type. Thus, one stateless session bean of a particular type is virtually indistinguishable from another of the same type. In view of these properties, stateless session beans of each type are pre-created by an EJB container in sufficient numbers and placed together in pools of stateless beans. Whenever a client requests a stateless bean of a certain type, a bean of that type is removed from the proper pool and given to the client. Once the client is done, the bean is returned to the pool. These beans are only created and/or deleted by the EJB container itself.

Multiple EJB clients, on the other hand, can share entity beans. They always have states and these states persist server shutdown or crash. Typically, these are implemented by writing any state-related data into a persistent store so that the bean can be reconstructed from the stored data after a server is restarted subsequent to a shutdown or a crash.

An entity bean instance is usually associated with a specific row (record) in a specific table. More complex mappings are also possible. An entity bean is also associated with a transaction. The bean's state is always in step with the transaction—if the transaction commits, the bean's state persists, and if the transaction rolls back, the bean is brought back to its initial state. This synchronization is automatic and seamless to a developer, unless the bean is deployed as having bean-managed persistence, or no transactional persistence at all. In general, a client can access a particular entity bean instance using an identifier or a key.

SUMMARY

As stated above, entity beans usually provide a mapping to data elements such as a row in a database, and therefore they are widely used to model business data. Since session beans provide session services, they are used to model business functions. Where transactional synchronization is needed, for example, in the case of a trouble-ticket entry system, the traditional method is to use stateful session beans together with SessionSynchronization interface as method of implementing such synchronization. But this method of implementation involves the generation of a large amount of code, and therefore is not elegant. Currently the number of clients, and not the number of resources limits the number of session beans.

Further, the traditional approach recommends that an entity bean be accessed only by a session bean and not directly by a client application according to the following model:

Client—>Session bean—>Entity bean—>Database Record

This is based on the idea that the entity bean must model only entities (i.e., one or more database records). A problem with this approach is that the service providers are not visible to the client, where there could be a need for such visibility. As stated earlier, if there is a need for a number of database records to be simultaneously accessed by a client, then there will be a proliferation of such beans if each record is modeled as an entity bean. In extreme cases, such a proliferation may result in a depletion of available resources for other tasks. Further, since access to these entity beans should be serialized, each successive client with a need to access a particular row (or an entity bean) for an update should wait for its turn. Moreover, there is an implicit assumption that the client should know beforehand the primary key (or the identifier) of the entity bean it needs to contact. The current methods do not provide an easy solution to these problems, though one could craft an unwieldy solution using session beans. Accordingly, there is a need for a new bean type that provides transactional capability of an entity bean without its persistence, and models business functions. These capabilities are transparent to the clients that request the bean's services.

Transactional synchronization as well as transactional integrity can be achieved by implementing a system using entity beans rather than session beans. Noting that object oriented computing methods departed from a procedural or a functional programming to encapsulate data rather than functions in objects, it has been discovered that mapping an object to a function, rather than to a data element provides significant advantages, especially in managing limited resources that are accessed by a plurality of clients. Further, the presently available Enterprise JavaBeans (EJB) can be programmed to achieve such a mapping.

Accordingly, in an embodiment, the disclosure is directed to a novel "functional" bean, which is devoted to modeling a business function. Clients do not need to know the particular primary key or identifier as in the case of an entity EJB; rather a client knows only a well-known Service Manager bean to obtain a handle to the correct type of functional bean.

If a client needs to request a service offered by such a functional bean, it can be invoked directly. In one aspect, these functional beans are created and managed by a bean container such as an EJB container. The container controls access to these beans by way of a Service Manager. In one embodiment, the Service Manager itself is modeled as a functional bean, whose function is that of a manager of the other functional beans. Thus, in one embodiment, a three-tiered model that can accomplish the task contains the following structure.

Client—>Functional bean—>Database view/record

There could be cases where a system does not require some attributes such as state management and persistence. In such a situation, a system designed using functional beans can be easily implemented without these attributes, typically associated with an entity EJB.

In one aspect, what is disclosed is a computer system comprising a plurality of sets of functional beans each set comprising at least one functional bean assigned to perform a particular business method, the computer system comprising: a microprocessor; a memory device coupled to the microprocessor; a service manager program coupled to the memory device and configured to a number of receive requests for at least one of a plurality of types of transactions from a plurality of clients; a load-sharing program coupled to the service manager program and configured to create instances of functional beans based on the number of requests from the plurality of clients; the service manager program configured to obtain a handle to an instance of a functional bean based on a type of transaction requested by a client; and the service manager program configured to return the handle to the client, wherein the client uses the handle to interact with the functional bean to execute a business method.

In another embodiment, the present disclosure includes a computer-processor-executable software code stored in a computer-readable memory, said code comprising: instructions to direct a computer processor to receive a first request from a client for a handle to a particular type of functional bean, said functional bean which comprises code to execute a particular business function; instructions to direct the computer processor to create an instance of a functional bean of the particular type requested; instructions to direct the computer processor to obtain a handle to said instance of said functional bean; and instructions to direct the computer processor to transmit to the client said handle to said instance of said functional bean, wherein the computer processor, responsive to a second request from the client enables the client to execute code comprised in the functional bean to accomplish the particular business function. In further aspects, the code further comprises instructions to receive the first request and the second request from the client via a computer network; or instructions to create a number of instances of functional beans of the particular type, said number being dependent on availability of resources; or instructions that allow a functional bean to instantiate a second bean of a second type in order to execute the business logic contained in the second bean instance. In a yet another aspect, the code further comprises instructions that allow an instance of a session Enterprise JavaBean to invoke the business methods contained in the functional bean. In a yet further aspect, the functional bean can call any type of EJB beans, including entity beans.

BRIEF DESCRIPTION OF THE DRAWINGS

These and other objects, features and advantages of the present invention can be more readily understood from the following detailed description with reference to the accompanying drawings, where like numerals represent like parts, and in which.

DETAILED DESCRIPTION

"Functional" EJB

Figure 1A:
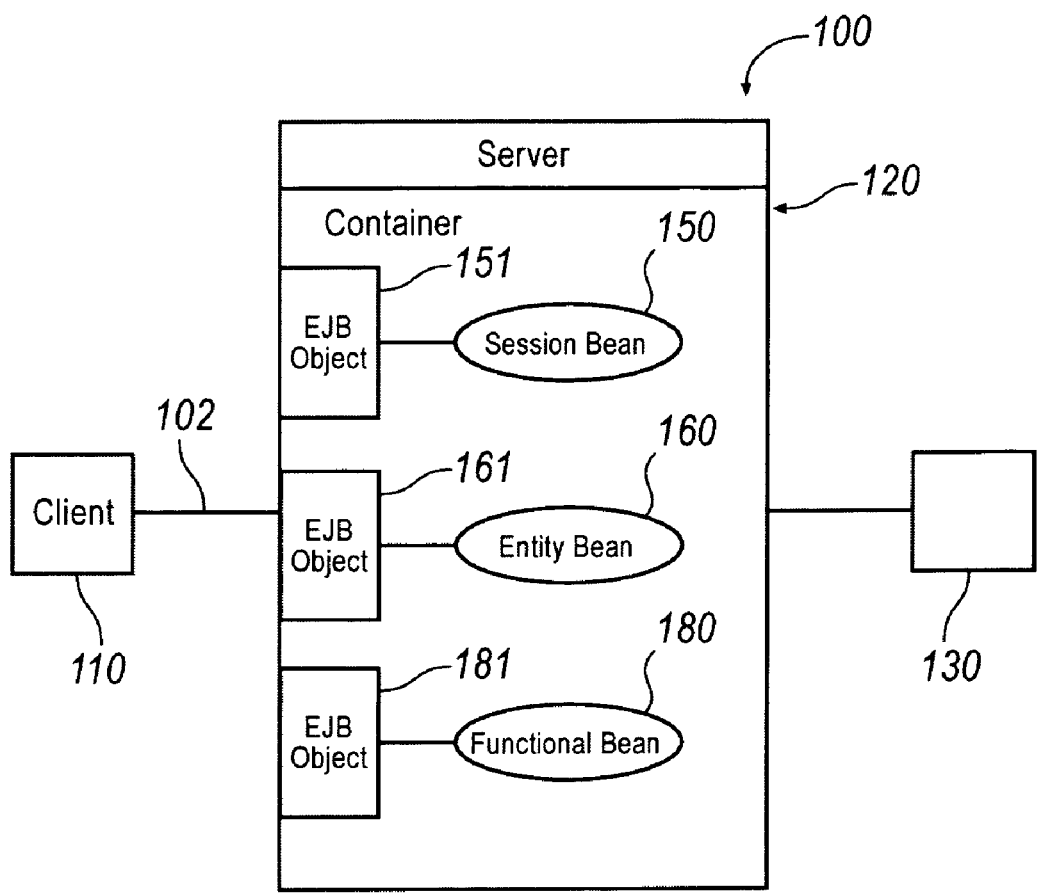
FIGS. 1(a)–(f) depict several exemplary architectural views of a client transaction utilizing a functional bean.

An aspect of the present invention includes incorporating certain functional (i.e., functions as objects) programming methods in the Enterprise JavaBean (EJB) model to accomplish certain tasks that are not easily accomplished by the session or entity beans as they are currently defined. It has been discovered that certain tasks such as updating a customer account are more advantageously implemented using a functional approach, which enables a programmer to define the business logic in the form of a series of steps performed on a set of entities (or objects).

This functional approach is advantageously accomplished by creating a novel server-side EJB. This novel EJB is hereinafter referred to as a "functional EJB" or a "functional bean." It should be noted that the principles of the present invention could also be used to enhance other server-side or client-side objects such as JavaBeans, or other entities, thereby allowing a programmer to take advantage of the functional bean type in a true object-oriented manner.

In an embodiment, the characteristics of the functional EJB designed according to the present invention include:

a) Transactional awareness, which is a default characteristic in an embodiment and is implemented by providing a persistent database to which transactional data are written.

b) Optionally, transparent support of transactional persistence, i.e., the data objects operated on by a functional bean's methods and any state information are persisted.

c) Allowing multiple clients to use a single instance of a functional bean. Since functional beans are designed to incorporate functions rather than data, they can receive a client request from a queue and service the client request without changing the request's own internal state. These requests can be serviced according to a particular scheme, such as a first-come, first-serve, and the like. In alternative embodiments, the functional bean can service client requests using a priority method as designed by a programmer or others skilled in the art.

d) A pool of functional beans of each functional type is maintained by the enterprise application server to load-balance the requests from clients.

e) Load sharing-handled according to a strategy that is either static or dynamic, such as round robin or least busy. A client need not know which instance of each type of functional bean is in communication with the client at any given moment; the client is required only to be aware of the type of the bean with which it is communicating.

f) The number of functional beans of each type in the pool can be configured at startup and/or dynamically controlled by the bean's container. Depending on the number and availability of limited resources—for example, the number of open connections allowed by a legacy system—determines the number of bean instances of each type. In an embodiment, a system administrator makes an appropriate choice of the number of instances of each bean type either statically or dynamically.

h) The functional bean does not map to one or more rows in a database.

i) A functional bean's methods do not by default allow for data persistence. An application or a business-logic programmer may choose to provide for explicit data persistence by programming the appropriate code, for example, by providing appropriate JDBC statements.

Referring to the drawings, FIGS. 1(a)–(f) depict several exemplary architectural views of a client transaction utilizing a functional bean. A client 110 executes a business method resident on an enterprise application server 100 via a network 102. It is assumed that the enterprise application server 100 comprises a container 120, which provides access to the several kinds of beans—session beans 150, entity beans 160 and functional beans 180—of possibly several types, each type implementing at least one function—to access with a data store such as the database 130. External entities such as clients or other beans can access the EJBs via instances of EJBObjects. FIG. 1(a) shows the client 110 accessing session bean 150, entity bean 160 and functional bean 180 via EJBObjects 151, 161 and 181 respectively. It is further assumed that there are different types of each kind of bean. For sake of simplicity, the details of how "handles" to the various types of beans are obtained by the client is not discussed here.

Figure 1B:
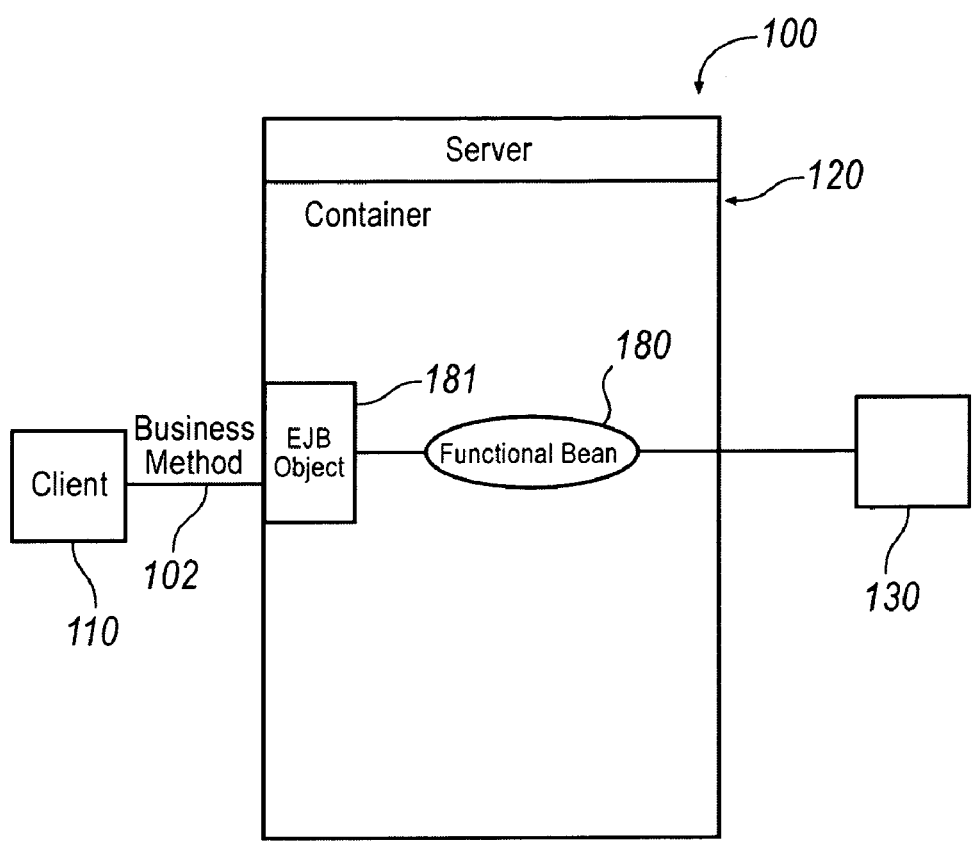

In a first aspect, shown in FIG. 1(b), the client 110 accesses a functional bean 180 and executes the business logic via the EJBObject 181. The functional bean 180 in turn provides access to the database 130 as shown. In this scenario, a three-level interaction takes place: Client—>functional bean—>database view(s) or record(s) or any limited resource. The container 120 includes the code to manage a client connection.

Figure 1C:
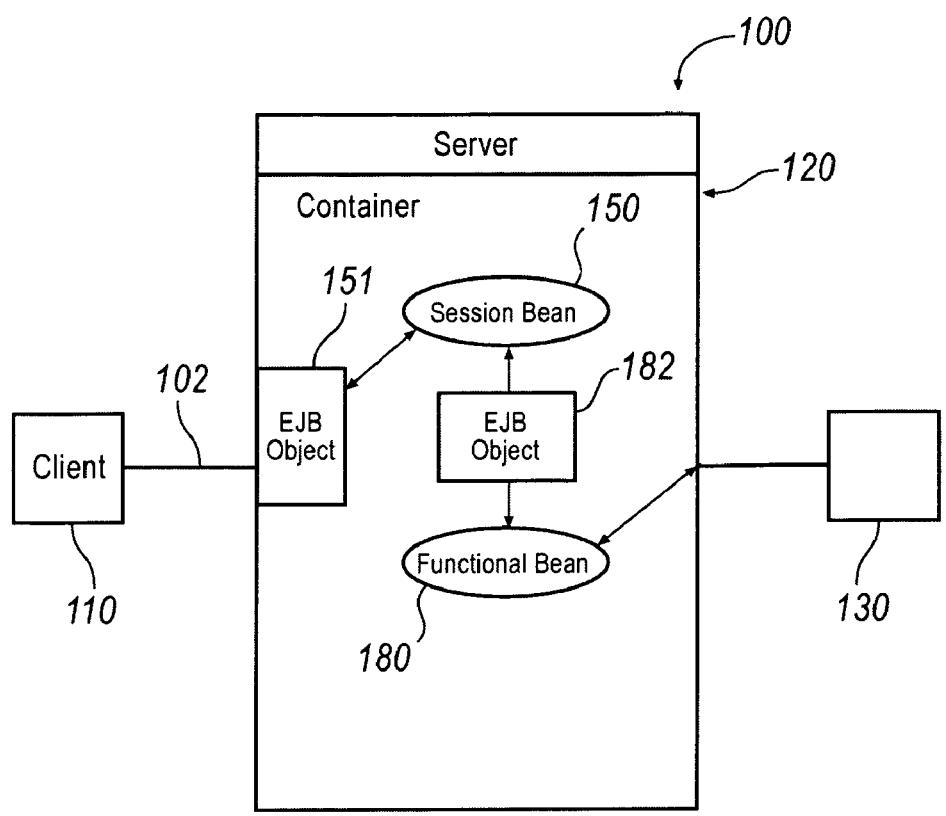

In a second aspect, shown in FIG. 1(c), a client 110 may invoke a session bean 150 via EJBObject 151 for connection management. The session bean 150 in turn invokes a functional bean 180 via EJBObject 182 to execute business logic and perform any database transactions as shown.

Figure 1D:
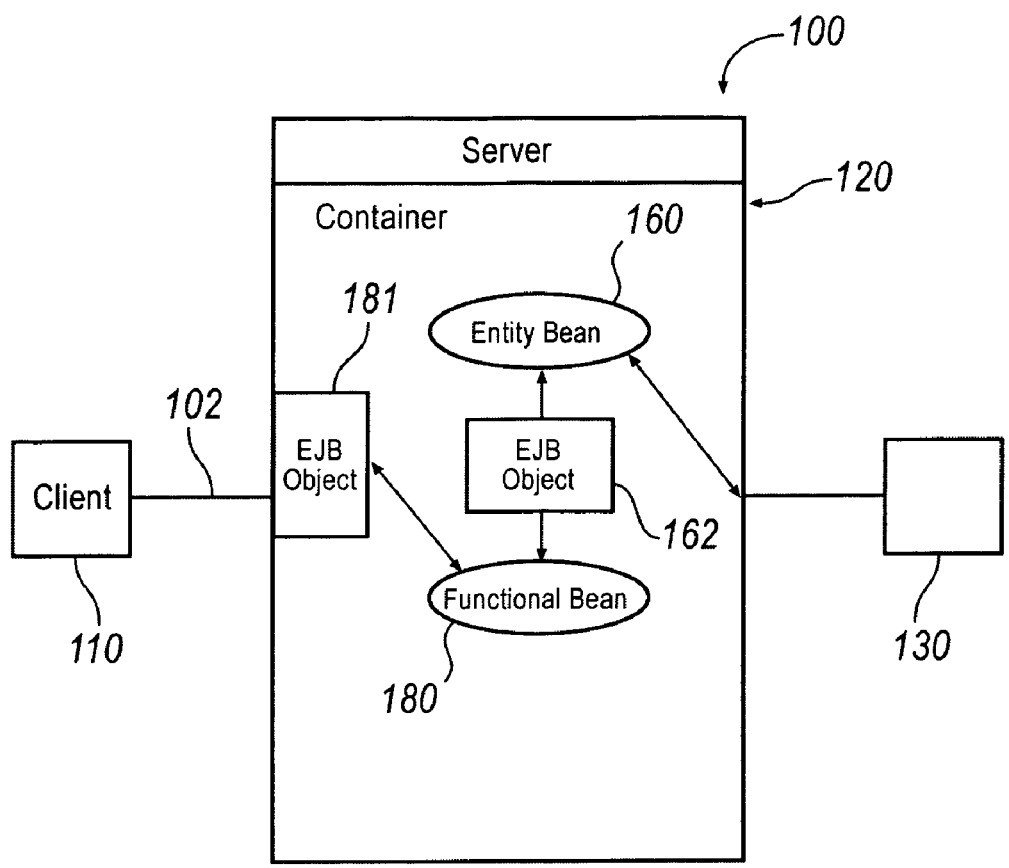

Referring to FIG. 1(d), a functional bean 180 manages the connection as in FIG. 1(b), but instead of providing access to the database 130 as in FIG. 1(b), invokes an entity bean 160—via an EJBObject 162—with a primary key or other identifier to interface with the database 130.

Figure 1E:
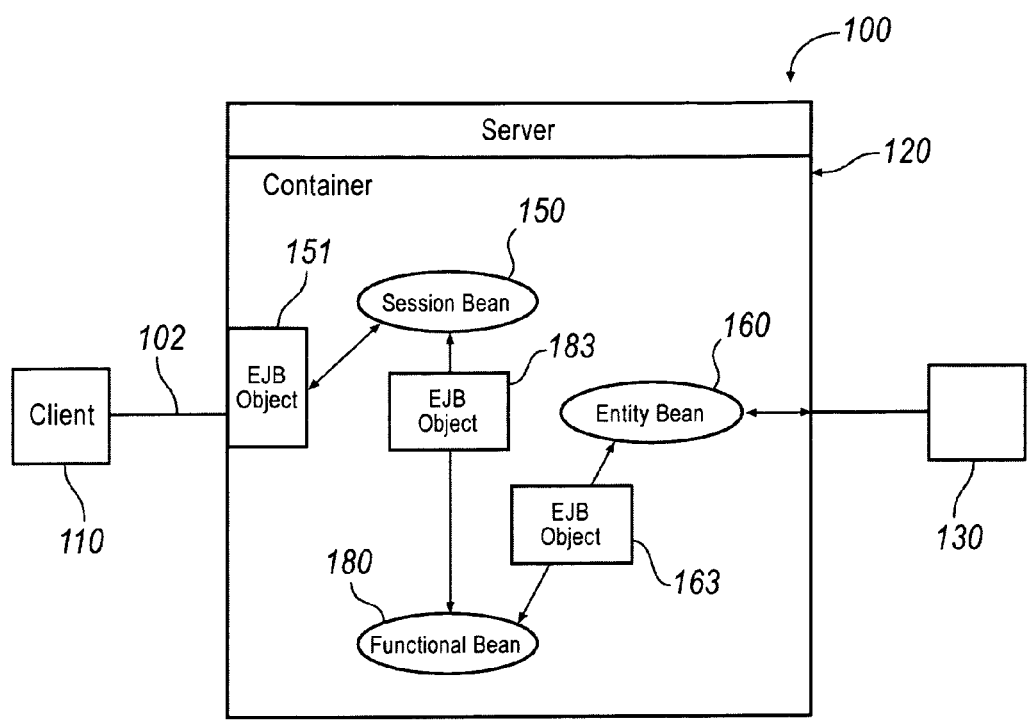

Referring to FIG. 1(e), another scenario includes a client 110 accessing a session bean 150 via an EJBObject 151 to establish and manage a session with the client 110. The session bean 150 invokes or mediates access to a functional bean 180 (via an EJBObject 183), wherein the functional bean 180 implements the business logic functions. The functional bean 180 invokes or utilizes the services of an entity bean 160 (via an EJBObject 163) to perform functions such as database updates. In a subsequent session, a new session bean 150 may be present to invoke the functional bean 180, but transactional persistence is taken care of by the container 120.

Figure 1F:
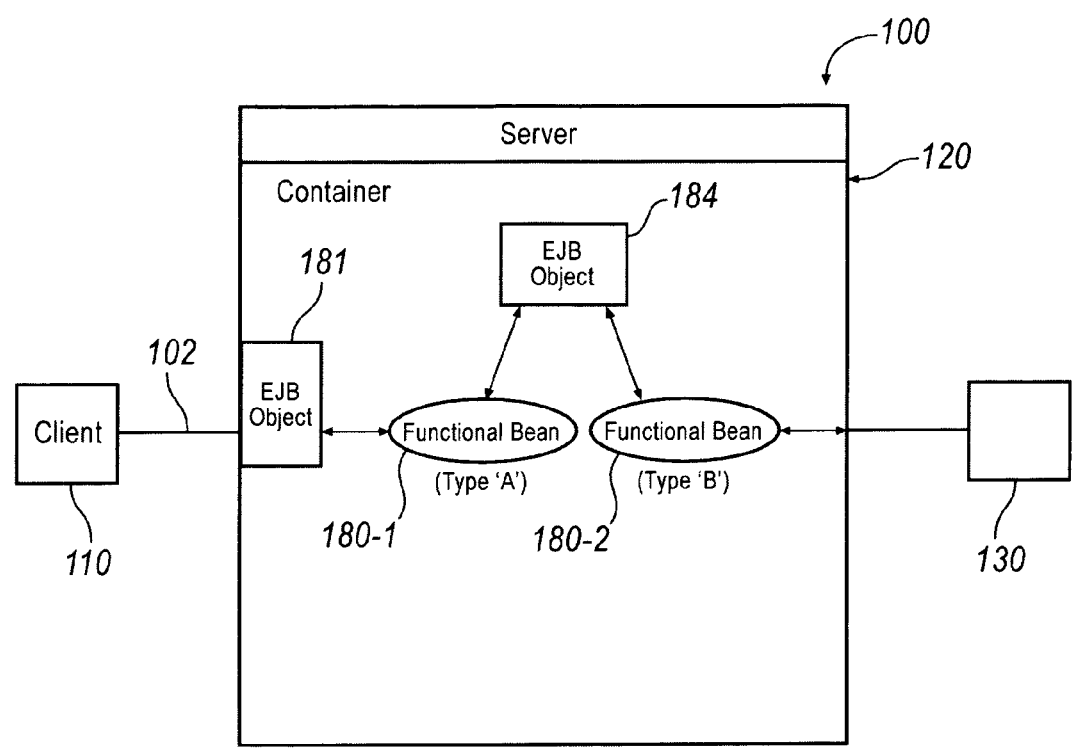

Referring to FIG. 1(f), a functional bean 180-1 of one type (type A) advantageously invokes a functional bean 180-2 of a different type (type B) (via an EJBObject 184) to accomplish a database transaction or any other type of transaction involving a limited resource.

Though the above describes a few scenarios, persons of ordinary skill in the art readily understand and extend the concept to arrive at other combinations of beans and bean types, all of which should be construed to be within the spirit and scope of the present invention.

Implementing a Functional Bean

In the following discussion, an implementer is defined as a business logic developer who implements the functional bean software for use by an application programmer.

A First Embodiment: Creating a Functional Bean Compiler and Container

Figure 2:
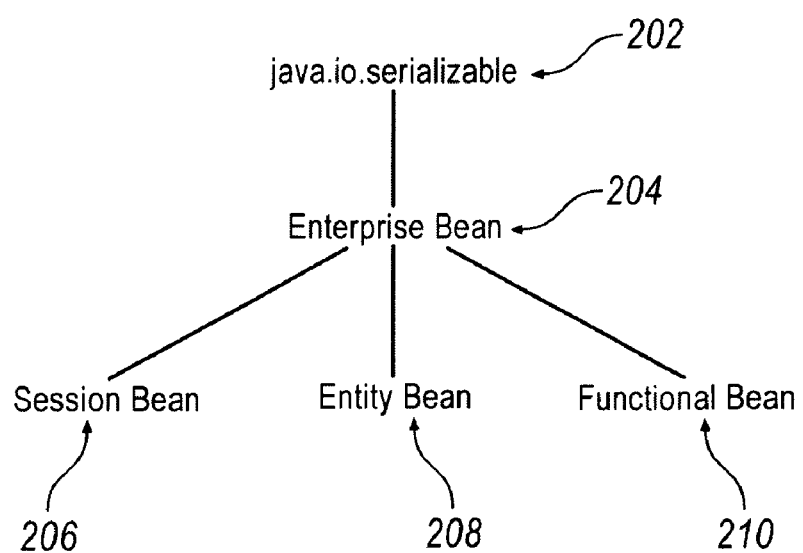
FIG. 2 shows a method of implementing the invented functional bean.

Referring to FIG. 2, in a first embodiment, the functional bean 210 is derived from the EnterpriseBean class 204. The EnterpriseBean class 204 is advantageously derived from class java.io.Serializable 202. Other possible derivatives of the EnterpriseBean 2024 class include session bean 206 and entity bean 208. Referring to FIG. 1(a), in this embodiment, the functional bean 180 operates within a container 120, which provides for transparency to an application or business logic programmer.

The container 120 provides deployment tools that facilitate a deployer to supply "start-up" information for any external resources. The container 120 further involves the external resources in functional bean transactions if the resource is transactional and can support transactions. Additionally, the container 120 provides for resource pooling and manages the resource pool in a manner transparent to the functional beans 180.

A functional bean compiler can be used to compile such beans created within the application server. Persons of ordinary skill in the art know design and development of the functional bean compiler and container. This accords a native support for functional beans. A container with native functional bean support would automatically provide transparency to an applications programmer, thereby eliminating the need to deal explicitly with a Service Manager (not shown in FIG. 2). Further, developing a functional bean compiler and container will eliminate the need for using an entity bean to implement a functional bean.

Thus, in a first embodiment, a functional bean is implemented by enhancing an enterprise application server's container to support functional beans. In this case, an implementer (of functional beans) can incorporate the functions of a Service Manager (not shown) in the container 120, thereby making the Server Request Manager invisible to the application programmer.

A Second Embodiment: Using an Entity Bean to Support a Functional Bean

In a second embodiment, an implementer may advantageously use an entity bean to develop the functional bean of the present invention. This embodiment enables users of commercially available EJB-compliant application servers who do not have access to EJB server's source code to modify it to support the new bean type. Such a user pays the price by losing the transparency of the new bean type. As an illustration, the Service Manager can be advantageously created using the tools provided by a commercial EJB compliant container. The Service Manager manages functionality such as functional bean pool management, configuration, and fail-over. Commercially available EJB-compliant container may be used to handle transaction management. The client, in collaboration with the Service Manager, handles transactional persistence by requiring additional explicit method calls.

Thus, in the second embodiment, an entity bean is used to provide the functionality of a functional bean. In collaboration with the Service Manager, the client handles functional beans in a non-transparent manner. In this implementation, the implementer cannot bypass the default behaviors of entity beans such as data persistence because he cannot override the default behaviors associated with the methods behind the Application Programming Interfaces (API) of a third-party EJB server code. In this case, functional beans can be implemented as entity beans that contain no data attributes or only a few attributes. This selection helps minimize any overhead associated with persisting those data attributes.

Both in the first and in the second embodiments, the implementer or the application programmer can limit the total number of functional beans of each type to a limited number. This limitation may be based on a number of factors such as the availability of system resources. Thus, in the second embodiment, the database persistence of the functional beans may be a feature of using entity beans, but this feature could be used or not used advantageously based on a designer's suitable selections.

Developing an Application Using a Functional Bean

A functional bean provides a functional unit that utilizes one or more scarce resources—such as socket connections to a back-end system, or a memory intensive resource—for its functionality and hence needs to be shared across the clients that need such resources. The number of functional bean instances can be determined by the number of scarce resources available to the application and can be configured by an application deployer. Load balancing multiple client requests across available functional bean instances can be performed by the container or Service Manager.

A container manages the functional bean's life cycle. The container notifies the bean to perform some task and additionally achieves advantages such as scalability. Transactions can either be container managed or bean managed.

In an embodiment, the Java™ programming language or other similar method may be used to develop an application using the functional bean. In both the first and the second embodiments, the invented functional beans are developed by (1) writing the code for home interface; (2) writing the code for remote interface; (3) writing the code for functional bean class; (4) compiling the code; (5) creating a deployment descriptor, which contains information about the functional bean including environment such as variables, references to other beans, and resource factories; and (6) creating a standard packaging jar file format, the "ejb-jar" file.

As an example, the functional bean may have the following remote interface.

import java.rmi.RemoteException;
import javax.ejb.*;
public interface OrderEntry extends EJBObject {
// list business methods here.
public String count( ) throws RemoteException;
}
Illustratively, the Home Interface can be described as follows.
import java.rmi.RemoteException;
import javax.ejb.*;
public interface OrderEntryHome extends EJBHome {
public OrderEntry create (String customerName, String customerAccount)

throws RemoteException, CreateException, BadAccountException;
// Remove and other create methods go here.
}

Resource Pooling

A functional bean can access resource factories, i.e., it can access databases, or pools of connections associated with any other type of resource. A deployer identifies the resources a functional bean needs and provides references to the resource factories in the deployment descriptor. In general, the deployment descriptor declaration includes description, name, type and any authorization required to access the resource factory.

Figure 3:
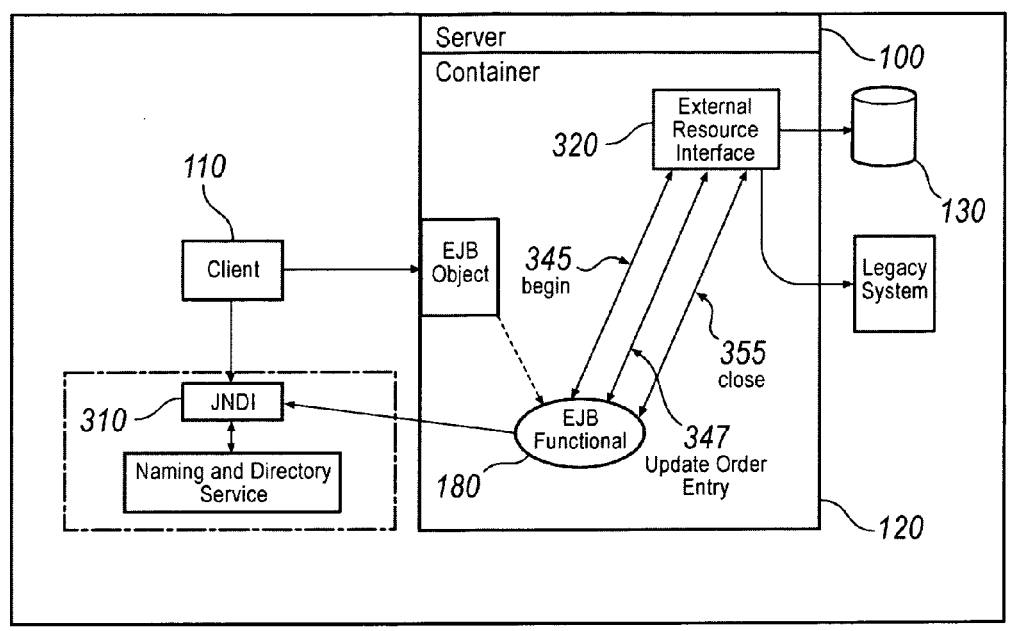
FIG. 3 depicts an exemplary method by which a functional bean obtains a handle to an external resource.

Referring to FIG. 3, the method by which a functional bean 180 obtains a handle to an external resource is depicted. In general, a provider of functional beans specifies the attributes of any external resources a bean needs during its lifetime. The functional bean 180 looks up a resource name using JNDI 310 to obtain an instance of an external resource such as a data source 130. This instance of the external resource interface 320 is used to access resources, which can be used by a functional bean 180 subsequently. If the functional bean 180 is configured to support bean-managed transactions, the functional bean 180 invokes a "begin" method 345 in the external resource interface 320 to transmit a message to the container 120 indicating that the functional bean 180 intends to begin a transaction that involves the external resource interface 320. After the begin method executes, the functional bean 180 performs a method 347 such as UpdateOrderEntry. After control of execution returns from the method 347 call, the functional bean 180 may release any external resources that it has acquired by calling a "close" 355 method on the external resource interface 320 after appropriately committing/rolling back the transaction. In an embodiment, in container-managed transactions, the functional bean does not need to explicitly begin and commit or rollback a transaction. This could be handled by the container 120 in a manner transparent to functional bean 180 before and after invoking a method on the functional bean 180. The following piece of code illustratively implements the method shown in FIG. 3.

```
public class LegacyGatewayBean implements SessionBean {
    EJBContext ejbContext;
    public void talkToExternalApplication( ... ) {
        ...
        // Obtain the initial JNDI context
        Context initCtx = new InitialContext();
    // JNDI lookup for the external resource factory
        com.foo.bar.ExternalDataSource eds =
            (com.foo.bar.ExternalDataSource) initCtx.lookup(
    "java:comp/env/external/LegacyConnectionPool");
    //Invoke the factory to obtain a resource
        com.foo.bar.ExternalResource res = eds.getResource();
    ...
    }
}
// The external resource interface could be a simple interface in order to
// accommodate diverse external applications. It defines the methods that
// signal the container of the bean's intended transactional boundaries.
// Implementers of external resources can extend the ExternalResource
// Interface to provide methods that address external application-specific
functionality.
    public interface ExternalResource {
        void begin();
        void commit();
        void rollback();
        void close();
    }
```

A functional bean deployer identifies the resources a functional bean may require during its lifetime and supplies mapping information needed to start-up to the external resources. The deployer binds the resource factory reference to a resource factory that exists in the target environment such as a database. A deployment descriptor is a device that allows the deployer to make this binding.

The following code sample illustrates how the deployer and the deployment descriptor achieve their respective functions.

```
// Specifying resource references in a functional bean's deployment
descriptor.
<enterprise-beans>
    <session>
        <ejb-name>LegacyGateway</ejb-name>
        <ejb-class>com.foo.bar.LegacyGatewayBean</ejb-class>
        ...
        <resource-ref>
            <description>
// data source for database that stores information needed by Legacy
Gateway bean.
            </description>
            <resource-ref-name>jdbc/LegacyGatewayDB<res-ref-name>
            <res-type>javax.sql.DataSource</res-type>
            <res-auth>Container</res-auth>
        </resource-ref>
        <resource-ref>
            <description>
// the data source for the pool of connections to the Legacy application.
...
</description>
<res-ref-name>external/LegacyConnectionPool</res-ref-name>
            <res-type>com.foo.bar.ExternalDataSource</res-type>
            <res-auth>Container</res-auth>
        </resource-ref>
    </session>
</enterprise-beans>
```

An Example Application: a Trouble Entry System Solution

An illustration of the disclosed principles is described in detail in the following with reference to an exemplary system for entering trouble tickets in a telephone company, which system is named "Trouble Entry System Solution" (TESS). It should be noted that this is used only to illustrate the principles of the present invention and not as a limitation.

Figure 4A:
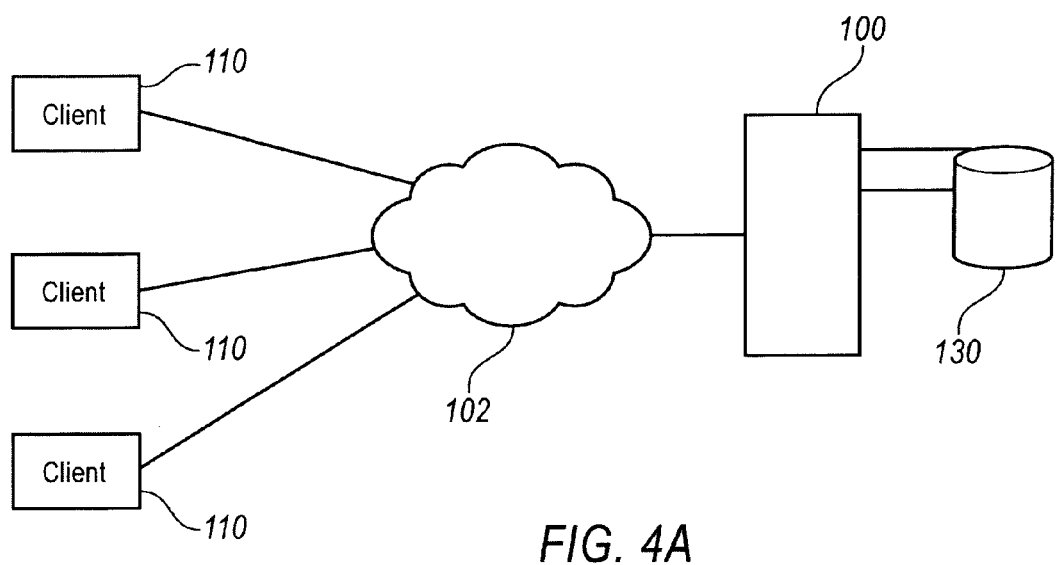
FIGS. 4(a)–(b), depict views of hardware architecture comprising a plurality clients coupled to a network, to which is communicatively coupled an enterprise application server.
Figure 4B:
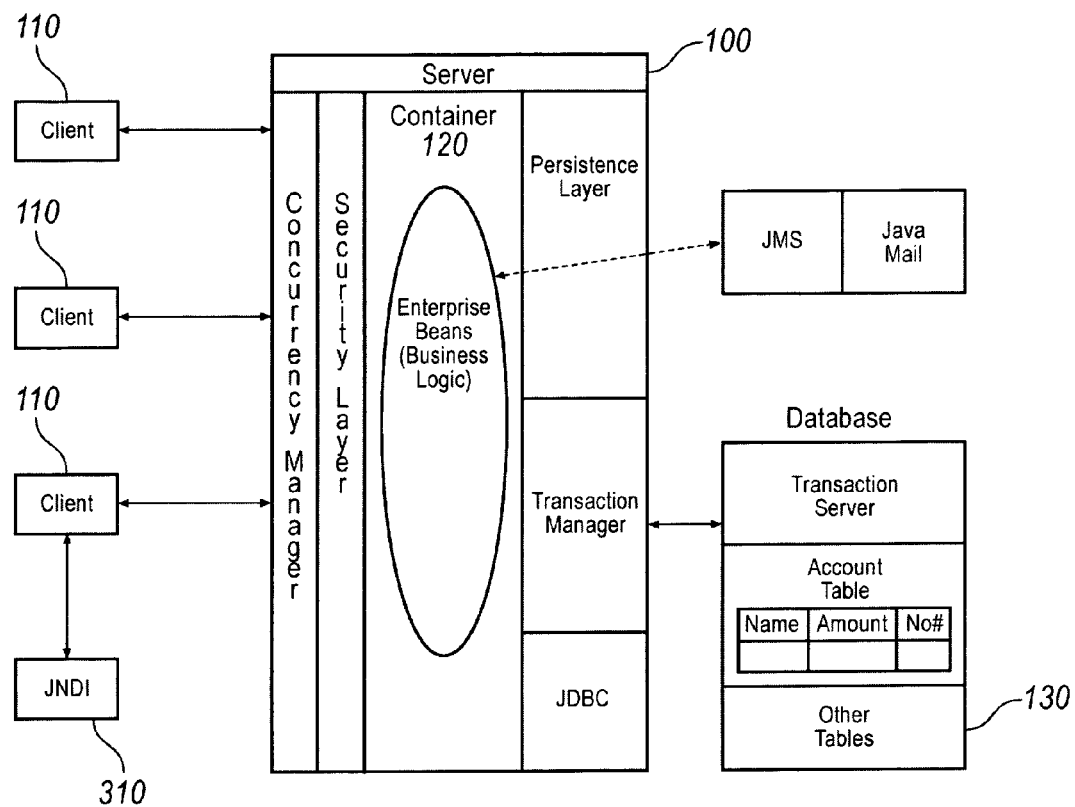

Referring to FIGS. 4(a)–(b), a hardware architecture may comprise a plurality clients 110 coupled to a network 102, to which is communicatively coupled an enterprise application server 100 incorporating the inventive principles disclosed herein. A database 130 is communicatively coupled to the enterprise application server 100. In an embodiment, the database 130 is a relational database management system such as the Sybase RDBMS. In other embodiments, the database 130 could comprise a number of legacy database systems running on different servers (not shown) communicatively coupled to the enterprise application server 100 via data communication protocols such as JDBC, TCP/IP sockets or others (not shown).

In an embodiment, the enterprise application server 100 comprises a programmed general-purpose computer including one or more central processor unit(s) (CPU) such as a Sparc™ processor marketed by Sun Microsystems, Inc. of Palo Alto, Calif. Further, the enterprise application server includes a storage device such as a hard disk, a memory device such as a semiconductor memory a communications device such as a network card to connect the enterprise application server 100 to the network 102. The enterprise application server additionally comprises an operating system such, as Solaris™ or Linux and is configured to communicate with other computers coupled to the network 102 via a protocol such as the Transmission Control Protocol/Internet Protocol (TCP/IP).

In addition to the configuration described above, the enterprise application server 100 may include server software based on the Enterprise JavaBeans (EJB) standard. Illustratively, the invented functional beans 180 are implemented by modifying the entity bean objects provided in the WebLogic™ (formerly, Tengah™) marketed by BEA Software Corporation of San Jose, Calif.

In alternative embodiments, the enterprise application server 100 is designed to support both Java application-based clients as well as web browser-based clients. The basic difference between the two is the location of the user presentation logic, and the type of components used to implement them. The Java application clients contain the presentation logic layer, while the web-based clients contain no presentation logic beyond the functionality provided by the web browser: the whole presentation logic layer is contained in servlets residing in the browser. The first can be described as "fat" clients, while the latter are known as "thin" clients.

Figure 5:
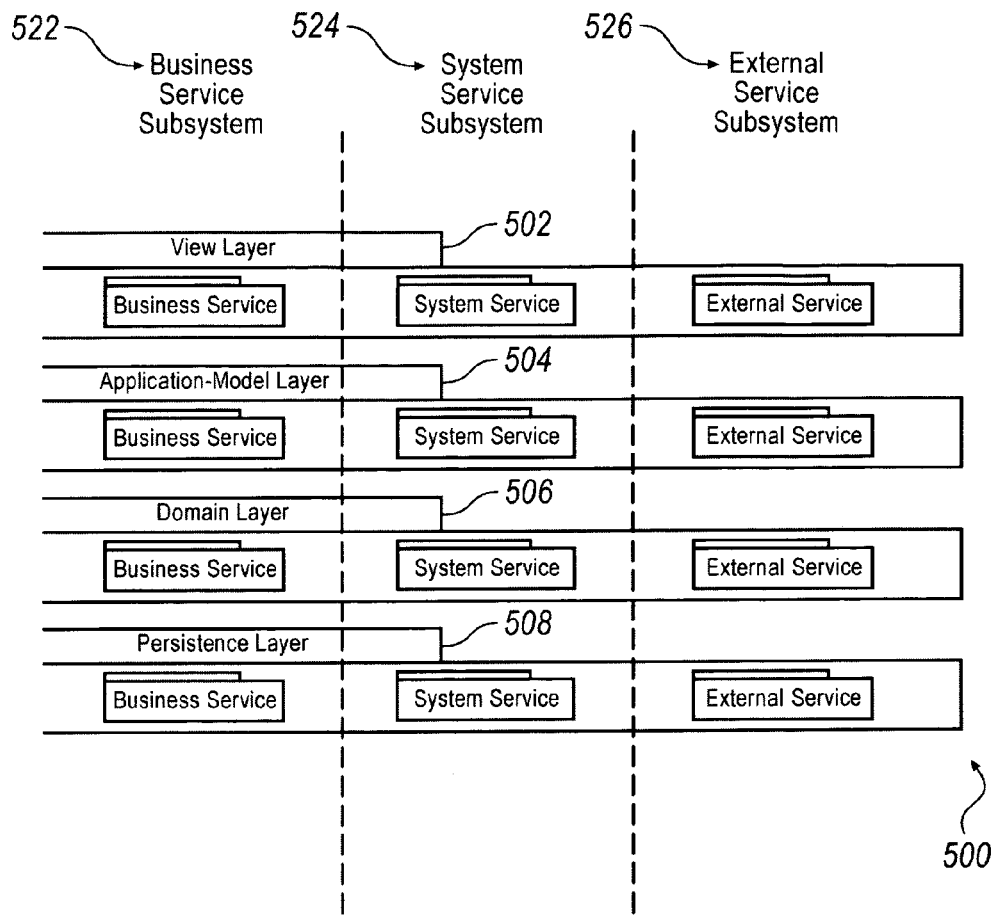
FIG. 5 depicts an architecture of software executing on an exemplary enterprise application server.

Referring to FIG. 5, which shows an exemplary architecture of software 500 executing on the enterprise application server 100. The software architecture 500 comprises a plurality of layers of software, each layer including a separate subsystem, for example, a view layer 502 (which includes the presentation logic); an application-model layer 504 (which is the middleware layer incorporating the business functions); a domain layer 506 (comprising business data persistence); and a persistence layer 508 (which includes code to accomplish data persistence). The layers are shown horizontally and the subsystems 522, 524 and 526 are shown vertically. Each layer includes a set of classes such as Enterprise JavaBeans that share certain responsibilities, utilize the services provided by a layer below, and/or provide services to a layer above.

The subsystems run across all layers. All the classes including the beans in a subsystem implement one or more related use cases, and thus provide a clearly defined and cohesive subset of the functionality. Persons skilled in the art understand how to construct use cases from a user requirements definition, and therefore, that method is not elaborated here. Each class corresponds to an individual, clearly defined piece of functionality. Examples of such functions include trouble entry and circuit testing. Subsystems are designed to be independent of each other and each subsystem is configured to satisfy specific business requirements.

In addition to the APIs provided, each layer is configured to include a set of common functions—known as frameworks—shared by all subsystems in that layer. In the example, these are configured to provide functions such as user authorization and authentication, metrics, and database access service with transparent fail-over, and the like.

As an illustration, in one embodiment, a DatabaseService component is configured to allow client objects from several layers to access the database without regard to the details of connection setup and management. In alternative embodiments, the database 130 could include a first database (a primary database), and a second database (a backup database), with a method that enables fail-over from the primary database to the backup database. The client objects are not aware from which pool they get their connections, or even which database is designated as the primary database.

Further, instances of classes-whether within the same layer or those from different layers-communicate via messages. This method of communication via messages is called coupling. An embodiment achieves weak coupling across layers by minimizing the number of classes from each layer that communicate with classes from other layers. In this architecture, database access, connection pooling, and database fail-over subsystems are weakly coupled to all other components.

Figure 6:
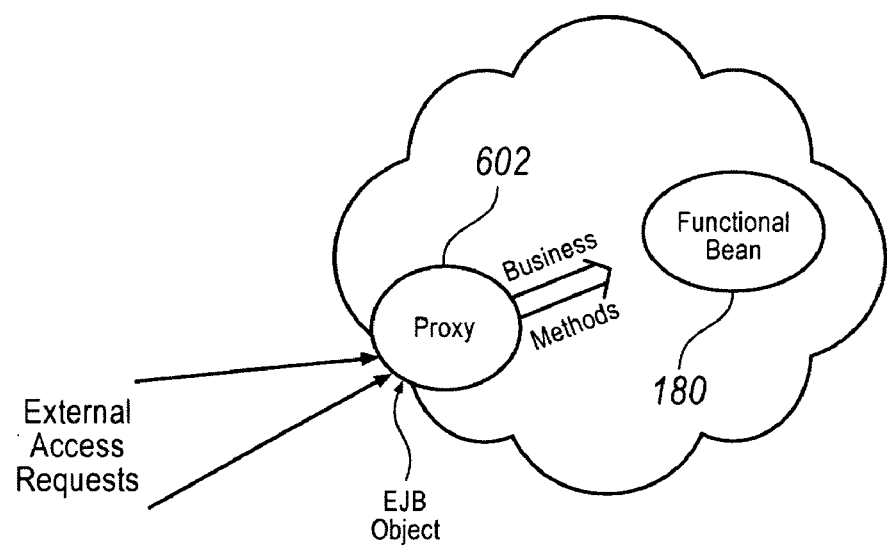
FIG. 6 shows an EJBObject acting as a proxy to mediate access to an instance of a functional bean.

Referring to FIG. 6, an EJBObject 602 is a configured as a network-visible, remote object, which prevents direct access to an instantiated functional bean 180 and acts as a stand-in for the functional bean 180 that has restricted access. Advantageously, the functional EJBObject 602 has a unique identifier that is assigned by the container 120. Further, the container 120 maintains a handle to the EJBObject 602, which can be used to access the functional bean 180.

Referring again to FIG. 5, when EJBs-functional, entity, and session beans-are used to implement subsystems in a given layer they are advantageously organized to provide a weak coupling between that layer and the one immediately above it because they provide a facade. Objects in the upper layer do not send messages directly to a non-adjacent lower layer's beans but to their interface objects, i.e., their respective EJBObjects (not shown in FIG. 5) through the intermediate layers. These objects act as proxies to the true EJBs, providing a simplified, controlled interface to the external world, isolating those EJBs from direct exchanges with external objects.

In the enterprise application server 100, several types of beans implement the business logic. In most cases, a single functional bean implements one specific business function, such as trouble ticket entry, history, transfer, and status. In some embodiments, other types of functional beans are also contemplated to work together with one type of functional bean. For example, the Trouble Entry functional bean also invokes the Trouble Status functional as part of its function. On the other hand, the Trouble Transfer functional bean does not call any other functional bean or EJB. The choice of using or not using other functional beans depends on a particular function to be implemented and the amount of code redundancy introduced by strictly adhering to developing functional beans that are independent of each other, i.e., loosely coupled. Functional beans that are independent of each other are attractive because they incorporate the virtues of loose coupling between subsystems; they make it easy for programmers to work independently and in parallel. This simplifies design, coding, unit and integration testing.

Some functional beans, such as TroubleEntry and TroubleTesting, are implemented as entity beans because they use scarce system resources such as the total number of socket connections to an external system such as a database. A system administrator or other deployer of beans determines the maximum number of functional beans of each type. The system administrator can set this maximum number not to exceed the total number of limited resources such as the number of simultaneous database connections available.

Functional beans are used to model functional (not data) entities, such as tellers in a bank. As customers arrive at a bank, i.e., as client requests arrive at the enterprise application server 100, a Service Manager routes the requests to an available teller from a pool of tellers. Instances of functional beans model the particular type of transaction the client requests-trouble ticket entry, account history, account status, and others. Thus, the Service Manager (the bank's concierge) controls access to the functional beans as described above, thereby achieving the following interaction:

Client→Functional bean→Database view/record

Figure 7:
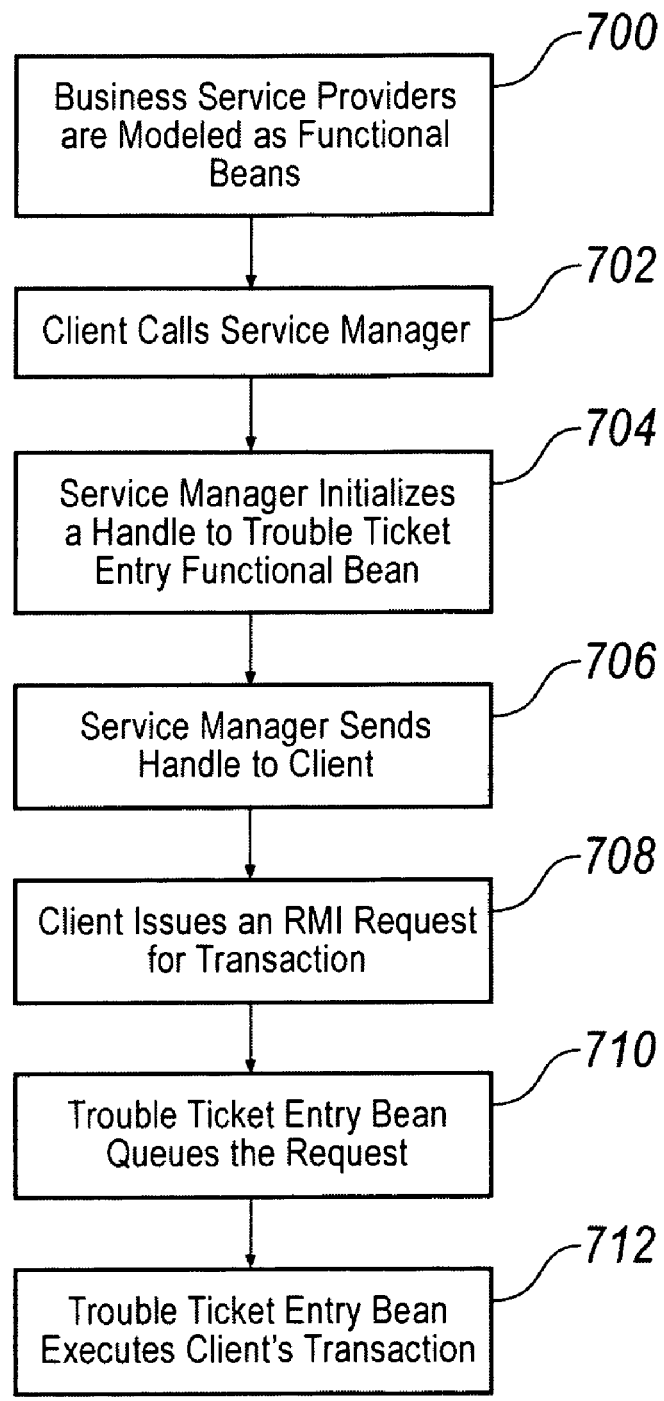
FIG. 7 is a flow-chart depicting the steps included in an illustrative transaction using a functional bean of the present invention.

Referring to FIG. 7, the steps included in a typical transaction are shown. As a first step, functional beans are created to model business service providers (step 700). A special functional bean called a Service Manager is also created. Then, suppose a client 110 requires a service provided by a particular type of functional bean, say, Trouble Ticket Entry. The client 110 first calls the Service Manager (step 702). Responsive to this request, the Service Manager initializes a handle to an instance of the Trouble Ticket Entry functional bean (step 704). The Service Manager sends the handle to the client 110 (step 706).

Thereafter, the client 110 can directly contact the Trouble Ticket Entry functional bean in the following way. The client 110 issues a request-for example, a request-for a transaction (step 708). This request is queued by the Trouble Ticket Entry bean (step 710). By queuing the requests, the clients do not get a response such as an "I-am-busy" exception from the TroubleTicketEntry bean whenever it is busy. Later the Trouble Ticket Entry bean executes the client's transaction (step 712).

At any time the client is free to access any number of functional beans of a particular type or of many different types. Adding additional clients causes the Service Manager to invoke a load-sharing program to instantiate additional functional beans based on the number of available resources. Actual clients will be assigned to existing functional EJBs using a load-balancing algorithm such as round robin. This makes the functional bean architecture fully scalable.

Since a functional bean can be developed as a transactional object, it can participate in a distributed transaction, i.e., calls to transaction-aware beans can be chained with full two-phase commit and rollbacks spanning several functional beans.

It should be noted that if a particular service does not need a functional bean's unique features, a developer may choose to implement the service as a stateful bean, a stateless bean, an entity bean, a java object, a java class, or even an extra method on an already existing java class. In alternative embodiments this choice is made based on the level of functionality, transactional-awareness and persistence required for that service. When services are implemented as session beans, it usually follows the following three-tiered model:

Client→session bean→External service

Or,

Client→session bean→Database view/record

Figure 8:
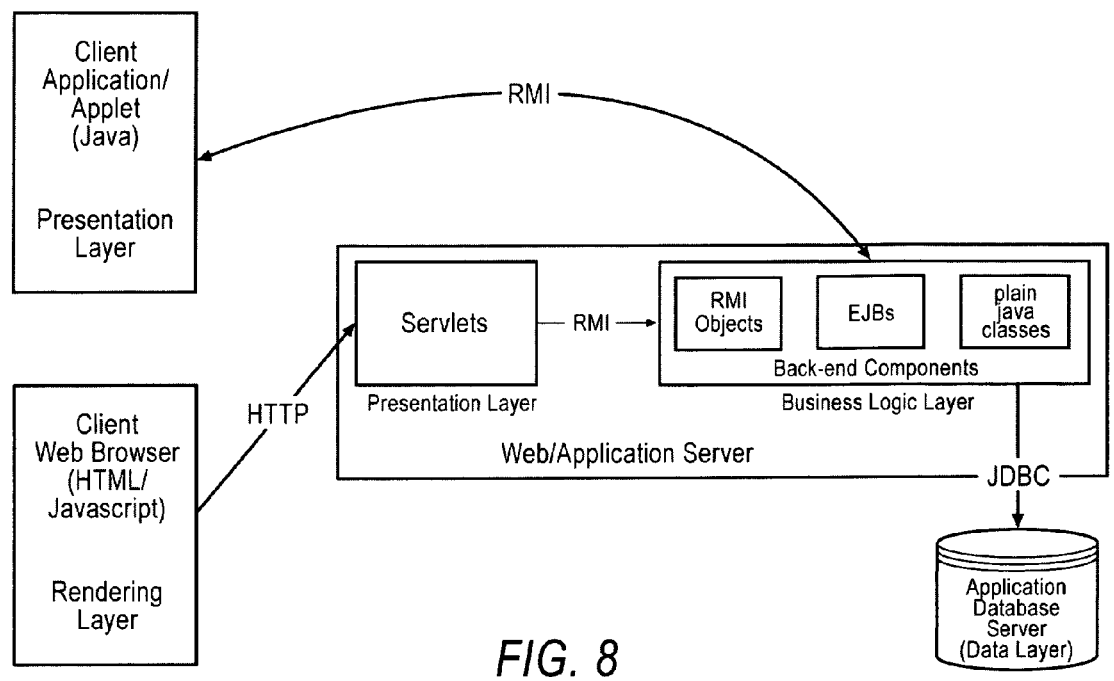
FIG. 8 is an alternative embodiment including a web-based client program executing a transaction.

Referring now to FIG. 8, in an alternative embodiment, a web-based client 110', which is a client such as the client 110 described above, except that it provides a browser program as a method to access the services offered by the enterprise application server 100 via a network 102 such as the Internet. An example of a browser program is the Internet Explorer marketed by Microsoft Corporation of Redmond, Wash. In this embodiment, the enterprise application server 100 is additionally configured to function as a web server. A web server typically serves web pages to the client, which web pages allow a user to send requests for information and receive response messages in the form of packets that display the information in the browser web pages. Additionally, in this embodiment, servlets 810 are advantageously used to provide the presentation logic for the user. Servlets 810 are server side components that enable a part of the presentation logic to be executed on a web server. They also can be configured to provide an interface to back-end components 820, or an external service such as a database 130. These back-end components 820 could comprise EJBs such as entity, session and functional beans that provide business services directly to application-based clients as described above. Thus, as shown, both the web-based client 110 and application-based clients 110 share functional beans as back-end components 820. This embodiment can also be implemented using Java Server Pages (JSP), which provide functionality equivalent to servlets. Server-side Common Gateway Interface (CGI) scripts and client-side applets or JavaScript can also provide alternative implementations, amongst other ways that are functionally equivalent to servlets.

The foregoing load-balanced and scalable access to limited system resources describes a new and useful enterprise software component that allows transactionally transparent persistence to clients over a communication network. Persons skilled in the art may make several modifications, enhancements or rearrangements without departing from the spirit and scope of the invention or without undue experimentation. For example, the invented software component can be implemented in a CORBA or a DCOM-compliant server; the enterprise application server 100 described herein can be scaled using a method such as clustering; several enterprise application servers may be configured to specialize a single or multiple functions to achieve a distributed functional architecture; resource management can be distributed; garbage collection can be provided for; high availability can be achieved by using standard methods; the object oriented components can be made reusable; complex objects can be transparently exchanged between components with a need to create object interface descriptions such as the IDL files required in CORBA; and clients can be implemented using any one of the known methods such as applet-servlet, or applet-RMI-EJB. Accordingly, all such modifications, enhancements, rearrangements and departures should be construed to be within the spirit and scope of the appended claims.

What is claimed is:

1. A computer system for supporting communication between a plurality of users and at least one application server comprising:
    an application service program on the at least one application server for receiving a client request from a client program executing on a computer associated with at least one of the users;
    a client interface program for communicating messages between said client program and said application service program;
    a service manager bean coupled to said application service program for creating and returning to said client program a handle to a functional bean appropriate to the client request wherein the functional bean is designed to incorporate functions rather than data and is configured to model a business function;
    a data store interface for coupling said application service program to a data storage system, said data storage system comprising at least one computing device, wherein said computing device is not said computer associated with said at least one of the users; and
    memory coupled to said application service program, said memory for queuing customer requests and for servicing the queued customer requests in accordance with the code contained in the functional bean, said code providing for access to the data storage system via the data store interface.

2. The computer system of claim 1 wherein the functional bean is accessible by a program running on the client via an EJBObject.

3. The computer system of claim 1 wherein the functional bean is configured to provide transactional persistence to a client transaction.

4. The computer system of claim 1 wherein the client is web-based.

5. The computer system of claim 1 wherein the client is an application, an applet, a servlet or a JSP that can communicate with an EJF Object's remote interface using RMI over TCP/IP or IOP.

6. The computer system of claim 1, wherein the functional bean is modified bean.

7. The computer system of claim 1, wherein the functional bean allows for data persistence.

8. A computer system comprising a plurality of sets of functional beans, each set comprising at least one functional bean assigned to perform a particular business method, the computer system comprising:
   a microprocessor;
   a memory device coupled to the microprocessor;
   a service manager program coupled to the memory device and configured to receive a number of requests from at least one of a plurality of types of transactions from a plurality of clients;
   at least one of a plurality of resources;
   a load-sharing program coupled to the service manager program and configured to create instances of functional beans based on a criterion, wherein each functional bean is designed to incorporate functions rather than data and is;
   the service manager program configured to obtain a handle to an instance of a functional bean based on a type of transaction requested by a client; and
   the service manager program configured to return the handle to the client, wherein the client is configured to use the handle to interact with the functional bean to execute a business method, wherein the functional bean is configured to model a business function.

9. The computer system of claim 8 wherein the criterion in based on the number of resources.

10. The computer system of claim 8 wherein the criterion is based on the number of requests from the plurality of clients.

11. The computer system of claim 8, wherein the functional bean is modified bean.

12. The computer system of claim 8, wherein the functional bean allows for data persistence.

13. Computer-processor-executable software code stored in a computer-readable memory, said code comprising:
   instructions to direct a computer processor to receive a first request from a client for a handle to a particular type of functional bean that is designed to incorporate functions rather than data and is;
   instructions to direct the computer processor to create an instance of a functional bean of the particular type requested;
   instructions to direct the computer processor to obtain a handle to said instance of said functional bean; and
   instructions to direct the computer processor to transmit to the client said handle to said instance of said functional bean,
   wherein the computer processor, responsive to a second request from the client enables the client to execute code comprised in the functional bean to accomplish a particular business function, wherein the functional bean is configured to model the business function.

14. The code of claim 13, further comprising instructions to receive the first request and the second request from the client via a computer network.

15. The code of claim 13, further comprising instructions to create a number of instances of functional beans of the particular type requested, said number being dependent on available of resources.

16. The code of claim 13, further comprising instructions that allow a functional bean to instantiate a second functional bean of a second type in order to execute the business logic contained in the second functional bean instance.

17. The code of claim 13, further comprising:
   instructions that allow a client to create a session with an instance of a session Enterprise JavaBean; and
   instructions that allow the session Enterprise JavaBean to provide access to invoke the business methods contained in the functional bean.

18. The code of claim 13, wherein the functional bean is modified bean.

19. The code of claim 13, wherein the functional bean allows for data persistence.

* * * * *